(12) United States Patent
Saigh et al.

(10) Patent No.: US 6,845,564 B2
(45) Date of Patent: Jan. 25, 2005

(54) LEVEL MONITORING SENSOR APPARATUS, SOLID STRUCTURE SENSOR APPARATUS, AND PENDULUM SENSOR APPARATUS

(75) Inventors: Fathi Saigh, Dollard-des-Ormeaux (CA); Richard Chartrand, Châteauguay (CA)

(73) Assignee: Quebec Inc., Dollard-des-Ormeaux (CA)

( * ) Notice: Subject to any disclaimer, the term of this patent is extended or adjusted under 35 U.S.C. 154(b) by 0 days.

(21) Appl. No.: 10/396,822

(22) Filed: Mar. 26, 2003

(65) Prior Publication Data

US 2004/0187329 A1 Sep. 30, 2004

(30) Foreign Application Priority Data

Mar. 25, 2003 (CA) ............................................. 2423395

(51) Int. Cl.[7] ................................................ G01L 1/00
(52) U.S. Cl. .............. 33/366.24; 33/1 HH; 33/DIG. 13
(58) Field of Search ......................... 33/366.24, 1 BB, 33/1 HH, 333, 366.11, 366.26, 366.27, DIG. 13, 391

(56) References Cited

U.S. PATENT DOCUMENTS

| 3,206,151 | A | * | 9/1965 | Lillestrand ............... 248/188.4 |
|---|---|---|---|---|
| 3,444,499 | A | | 5/1969 | Lovelace |
| 3,464,259 | A | | 9/1969 | Farr |
| 3,599,479 | A | | 8/1971 | Kutsay |
| 3,995,247 | A | | 11/1976 | Kurtz |
| 4,223,443 | A | | 9/1980 | Bachmann et al. |
| 4,468,864 | A | * | 9/1984 | Westphal et al. ......... 33/366.14 |
| 4,484,186 | A | * | 11/1984 | Wood et al. ................ 340/689 |
| 4,945,347 | A | * | 7/1990 | Perry .......................... 340/689 |
| 2001/0034948 | A1 | * | 11/2001 | Matsumiya et al. ........... 33/553 |

* cited by examiner

Primary Examiner—Christopher W. Fulton
Assistant Examiner—Tania Courson
(74) Attorney, Agent, or Firm—Ogilvy Renault (57) ABSTRACT

An apparatus for monitoring level variations in a given orientation of a structure, comprises a support portion secured to a structure to be monitored as a function of the given orientation in an adjustable position with respect to the horizon. A balancing arm hangs from the support portion in a resting position with respect to the horizon with one rotational degree of freedom being provided between the support portion and the balancing arm, such that a level variation in the given orientation of the structure causes the balancing arm to tend toward the resting position due to gravitational force A retaining member interrelates the balancing arm to the support portion, the retaining member retaining the balancing arm in the resting position. Sensors are positioned on the retaining member and are wired to a control system to measure strain of the retaining member resulting from the balancing arm tending toward the resting position, to quantify the level variation in the given orientation.

7 Claims, 6 Drawing Sheets

LEVEL MONITORING SENSOR APPARATUS, SOLID STRUCTURE SENSOR APPARATUS, AND PENDULUM SENSOR APPARATUS

TECHNICAL FIELD

The present invention generally relates to sensors used on structures to monitor, particularly but not exclusively, level variations in magnitude, orientation, and deformation resulting from, for example, deflection or tilt.

BACKGROUND ART

Sensors of all types are installed on large-scale structures to measure parameters such as level variation, deformation and tilt resulting from a plurality of internal factors, e.g., material quality, foundations, and external factors, e.g., wind, temperature variations, earthquakes, landslides, ice and snow build-up. The sensors are provided to ensure the safety of occupants or users of the large-scale structures, by monitoring unusual variations in the above-described parameters, which could cause severe damage. Such monitoring would indicate when corrective action needs to be taken to prevent failure of such monitored structures.

It would be desirable to provide various sensor apparatuses that could be installed on existing older structures, e.g., without sensor apparatuses, or new structures, that isolate the various parameters by their configuration.

SUMMARY OF INVENTION

It is a feature of the present invention to provide a novel sensor apparatus for monitoring a level variation in a given orientation of structures.

It is a further feature of the present invention to provide a novel sensor apparatus for measuring deformation of structures so as to prevent cracks.

It is a still further feature of the present invention to provide a novel sensor apparatus for monitoring magnitude and orientation of level variations of structures.

According to the above features of the present invention, from a broad aspect, there is provided an apparatus for monitoring level variations in a given orientation of a structure, comprising: a support portion, adapted to be secured to a structure to be monitored as a function of said given orientation in an adjustable position with respect to the horizon; a balancing arm hanging from the support portion in a resting position with respect to the horizon with one rotational degree of freedom being provided between the support portion and the balancing arm, such that a level variation in said given orientation of the structure causes the balancing arm to tend toward said resting position due to gravitational force; a retaining member interrelating the balancing arm to the support portion, the retaining member retaining the balancing arm in said resting position; and at least one sensor positioned on the retaining member and adapted to be wired to a control system to measure strain of the retaining member resulting from the balancing arm tending toward the resting position, to quantify the level variation in said given orientation.

According to a further broad aspect of the present invention, there is provided an apparatus for monitoring deformation and stress in a given orientation of a structure, comprising: a first post and a second post each having a connection end adapted to be secured to a structure to be monitored, and a free support end, the free support ends of the first post and the second post being separated by a gap, the gap being oriented as a function of said given orientation; a sensor portion having a first leg and a second leg, the first leg and the second leg being interconnected at a first end, and each connected to a respective one of the free support ends at a second end so as to bridge the gap such that a deformation and stress of the structure causes strain of the first leg and the second leg of the sensor portion; and at least one sensor on a surface of at least one of the legs, the at least one sensor adapted to be wired to a control system to quantify a deformation of the structure as a function of said strain.

According to a still further broad aspect of the present invention, there is provided an apparatus for monitoring a level variation and an orientation thereof of a structure, comprising: a support portion adapted to be secured to a structure to be monitored in an adjustable position with respect to the horizon; a pendulum hanging freely from the support portion in a resting position with respect to the support portion, the wire of the pendulum adapted to be wired to a control system; an orientation ring supported by the support portion so as to be concentrically disposed with respect to the pendulum in the resting position, the orientation ring being segmented in ring portions each identified to an orientation value and each adapted to be wired to the control system; and at least one amplitude ring supported by the support portion so as to be concentrically disposed with respect to the pendulum in the resting position, the at least one amplitude ring being adapted to be wired to the control system; wherein a level variation of a given amplitude of the structure causes a displacement of the pendulum with respect to the resting position such that the pendulum closes contact with said at least one amplitude ring to signal a level variation of at least said given amplitude, and with at least one of said ring portions to indicate an orientation of said level variation.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
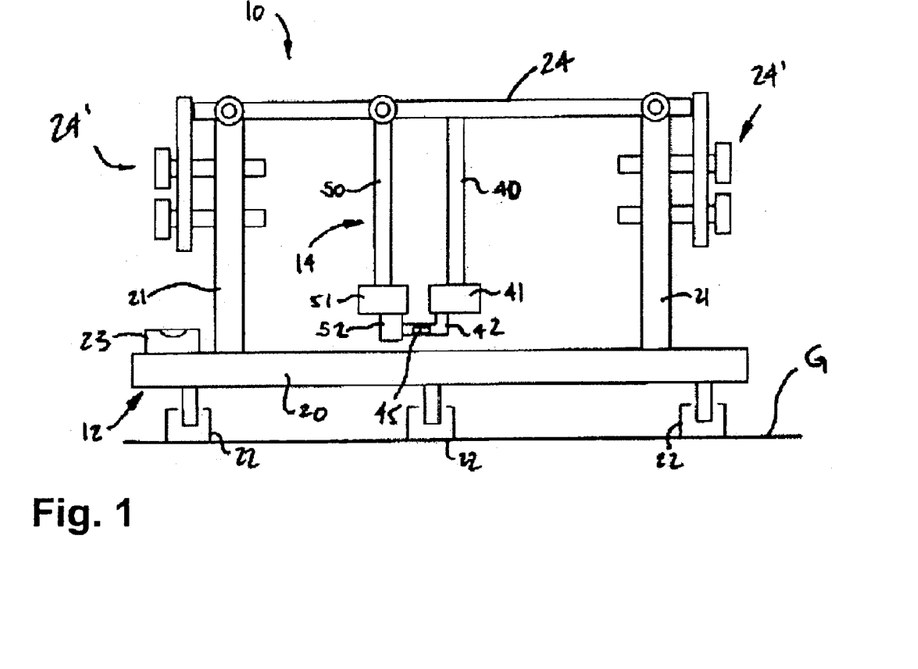
FIG. 1 is a schematic front elevational view of a level monitoring sensor apparatus in accordance with the present invention.

Referring to the drawings, and more particularly to FIG. 1, a level monitoring sensor apparatus is generally shown at 10. The apparatus 10 generally consists of a support structure 12 and a sensor mechanism 14. A casing (not shown) may also be provided in order to conceal the apparatus 10.

The structure 12 has a base 20 from which a pair of posts 21 project upwardly. The structure 12 stands on a surface G to be monitored by a plurality of legs 22 (e.g., three legs 22). The legs 22 are preferably vertically adjustable (e.g., telescopic legs, bolt-and-nut legs) so as to level the apparatus 10 with respect to the horizon, by way of level 23. A support beam 24 extends horizontally between free ends of the posts 21 and is fixed thereto. A fixed arm of the support structure 12 is fixed to the support beam 24.

Figure 2A:
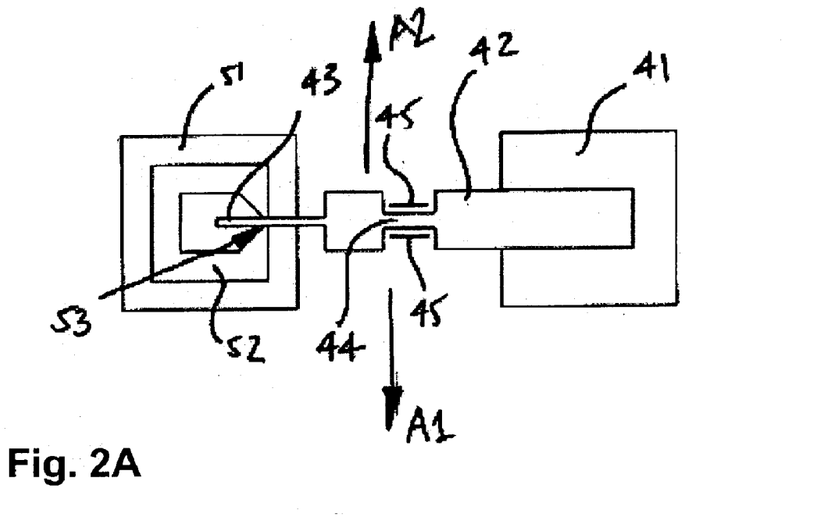
FIG. 2A is a bottom plan view of a sensor mechanism of the level monitoring sensor apparatus of the present invention.
Figure 2B:
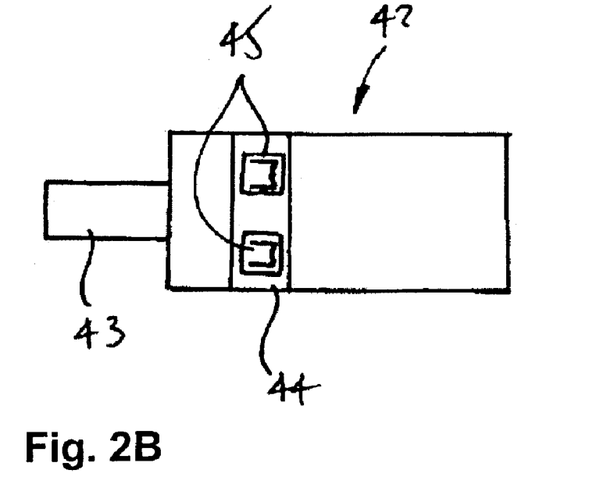
FIG. 2B is a side elevational view of a finger of the sensor mechanism of the level monitoring sensor apparatus.

The fixed arm 40 has a weight 41 at a free end thereof, and a finger 42 projecting from the weight 41 towards the balancing arm 50. The finger 42 is best shown in FIG. 2A and 2B. The finger 42 has in a preferred configuration a free end 43, and a retaining wall 44 is provided in a throat portion of the finger 42. Strain gauges 45 are positioned on the retaining wall 44 with opposed gauging surfaces, and are wired so as to measure the strain that will be sustained by the finger 42, for instance, at the free end 43.

The sensor mechanism 14 has a balancing arm 50 that hangs from the support beam 24. The balancing arm 50 can pivot about the support beam 24. The balancing arm 50 thus moves in a swinging motion, as best shown by arrows A1 and A2 of FIG. 2A. In other words, when contemplating FIG. 1, the balancing arm 50, if displaced, would come out of the page.

The balancing arm 50 has a weight 51 at a free end thereof, with an arch 52 connected to a bottom surface of the weight 51, which will cooperate with the finger 42. More specifically, the cooperation between the finger 42 and the arch 52 is shown in greater detail in FIG. 2A. The arch 52 defines an opening 53 in which the free end 43 of the finger is received. The opening 53 is substantially of the same size as the thickness of the free end 43 of the finger 42, such that there is no play therebetween.

The apparatus 10 is mounted to a surface whose level needs to be monitored. The base 20 is positioned so as to be horizontal with respect to the ground, in which case the fixed arm 40 and the balancing arm 50 are aligned with respect to one another, with the arms 40 and 50 being normal with respect to the horizon. In such a position, the balancing arm 50 does not exert any pressure on the fixed arm 40 through the arch 52/finger 42 cooperation. The apparatus 10 will be subjected to level variations of the supporting surface G, and this will unbalance the balancing arm 50, resulting in the balancing arm 50 being normal with respect to the horizon. A bending of the retaining wall 44 will result from this unbalance, and will be measured by the strain gauge 45.

On the other hand, the fixed arm 40 will not pivot due to its rigid connection with the support beam 24. The pivoting of the balancing arm 50 will be transmitted to the finger 42 by the arch 52 of the balancing arm 50. The displacement of the balancing arm 50 with respect to the fixed arm 40 will cause opposing effects of tension/compression on the opposed gauging surfaces of the retaining wall 44. This will be picked up by the strain gauges 45, and the signal will be interpreted as a function of the level of the element that is measured, to indicate a level of the surface G of the element being measured. Circuit configurations for the strain gauges 45 will be discussed hereinafter.

The apparatus 10 is strategically positioned in view of level variations of the surface G. For instance, it is preferred to position the apparatus 10 such that the plane of rotation of the balancing arm 50 is superposed on the plane of the level variation of the greatest magnitude. The sensor apparatus 10 is preferably used to isolate a level variation in a single orientation of a structure. For instance, it may be unnecessary to measure the level variation in every orientation on structures that are elongated. For instance, a span of a bridge can be equipped with the sensor apparatus 10 adequately positioned such that the level variation in a longitudinal dimension of the span, i.e., from pier to pier, is measured.

The longer the fixed arm 40 and the balancing arm 50 are, the greater the balancing effect will be therebetween. Moreover, the weight 51 of the balancing arm 50 accentuates the strain picked up by the strain gauges 45. On the other hand, the weight 41 stabilizes the fixed arm 40.

It is advantageous to have a single rotational degree of freedom between the balancing arm 50 and the fixed arm 40, as this will cause a direction of level variation to be isolated. The fixed arm 40 and the balancing arm 50 are preferably identical (i.e., in length and in cross-section), such that thermal expansion/contraction of the arms 40 and 50 will not have an effect on the strain measurement.

Figure 3:
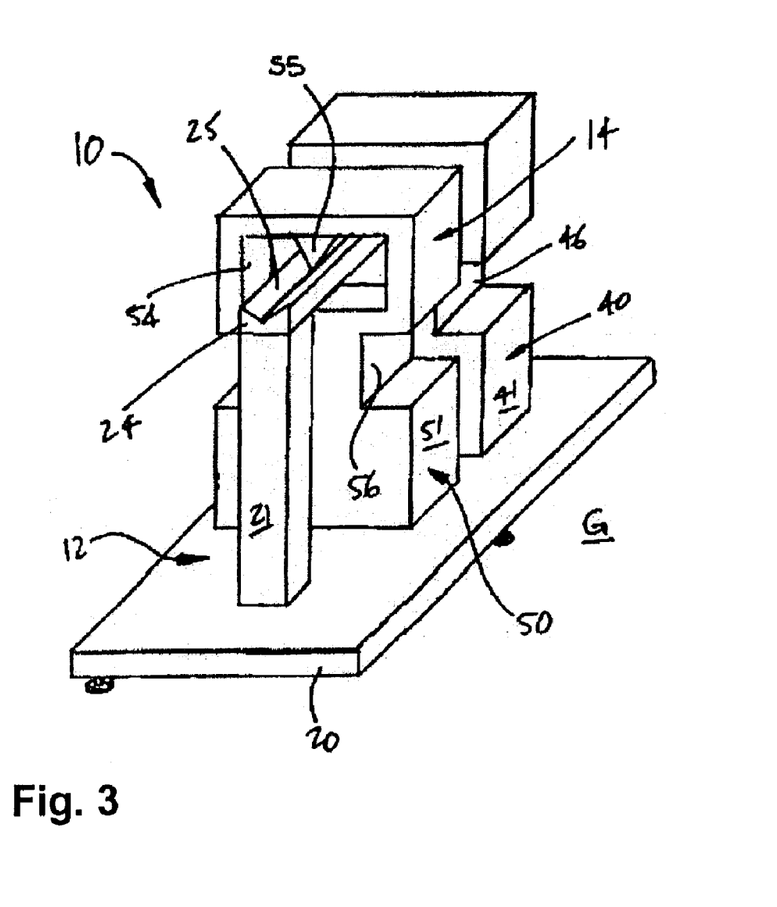
FIG. 3 is a perspective view of the level monitoring sensor apparatus in accordance with a first embodiment of the present invention.

Referring to FIG. 3, a preferred configuration of the level monitoring sensor apparatus 10 is shown. The support beam 24 is provided with a trough 25, and the balancing arm 50 defines a channel 54 in which a triangular cross-section pivot 55 is positioned so as to be received in the trough 25. The fixed arm 40 and the balancing arm 50 are shown having a throat portion 46 and 56, respectively, at a bottom of which weights 41 and 51, respectively, are located. As mentioned previously, the fixed arm 40 is fixed to the support beam 24. Alternatively, the balancing arm 50 can be mounted to the support beam 24 by a bearing, as schematically shown in FIG. 1. The support beam 24 is also illustrated as being supported by bearings, whereby a locking system 24' is required to set the support beam 24 once the fixed arm 40 is vertically aligned.

The level monitoring sensor apparatus 10 is designed to monitor the slightest level variation in any structure standing, hanging, held from one or multiple corners, held from the center, or resting flat on the ground. This movement can be caused by various factors such as time, wind, earthquake, load supported by the structure, pressure, landslide, defects in the material of the structure, loose joints, and poor support or poor foundation. It is contemplated to set threshold values of strain sustained by the finger 42 (e.g., at the free end 43), at which an alarm would sound to indicate abnormally high level variations. The sensor apparatus 10 can readily be installed on existing structures.

As mentioned previously, the greater the length of the arms 40 and 50 is, the smaller the level variation measured can be, as the length of the arms 40 and 50 is proportional to the strain of the finger 42. It is also possible to reduce the height and the width of the retaining wall 44 so as to increase the signal picked up by the strain gauges 45. A thinner and shorter retaining wall 44 will be more sensitive to the pressure exerted by the balancing arm 50.

Figure 4A:
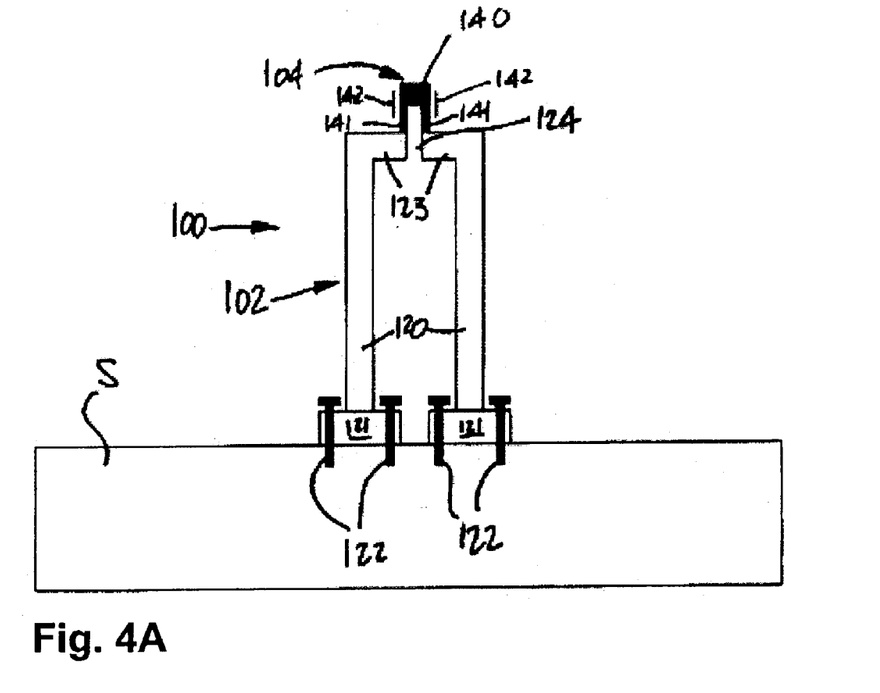
FIG. 4A is a side elevational view of a solid structure sensor apparatus in accordance with the present invention.

Referring to the drawings, and more particularly to FIG. 4A, a solid structure sensor apparatus in accordance with the present invention is generally shown at 100. The solid structure sensor apparatus 100, hereinafter "sensor apparatus 100," is shown secured to a solid structure S to be monitored.

Figure 4B:
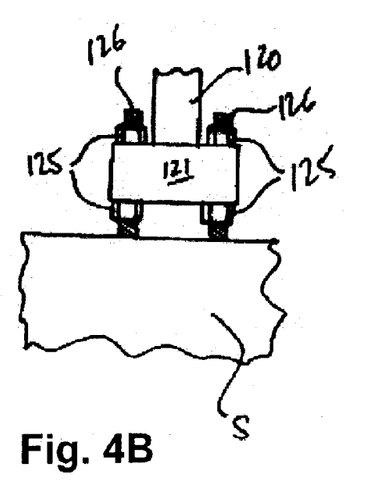
FIG. 4B is a side elevational view of an alternative embodiment of a connection end of the solid structure sensor apparatus.

The sensor apparatus 100 has a mount portion 102 and a sensor portion 104. The mount portion 102 has a pair of upstanding posts 120. Each post 120 has at a bottom end thereof connection ends 121 so as to be fixed to the solid structure S. The connection ends 121 are illustrated nonrestrictively as perpendicularly disposed plates used in combination with bolts 122 to secure the sensor apparatus 100 to the solid structure S. The free end of each post 120 has a horizontal support portion 123, which consists of perpendicularly disposed flanges. The horizontal support portions 123 of the posts 120 are separated by a gap 124. In another embodiment of the sensor apparatus 100, illustrated in FIG. 4B, a plurality of threaded rods 126 are welded, inserted, glued or cemented to the solid structure S. The connection ends 121 are sandwiched between nuts 125, threadingly engaged with the threaded rods 126, such that the sensor apparatus 100 can be leveled.

Figure 5:
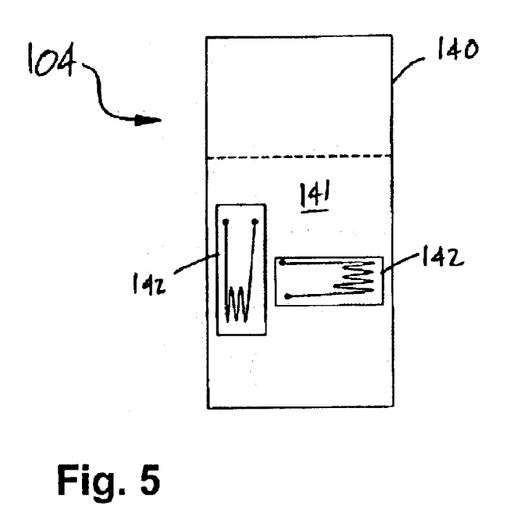
FIG. 5 is a front elevational view of a sensor portion of the solid structure sensor apparatus of the present invention, illustrating a preferred positioning of strain gauges.

Referring to FIG. 4A, the sensor portion 104 has an inverted U-shaped body 140, whose opposed ends sit on the horizontal support portions 123 of the posts 120. The sensor portion 104 is fixed to the mount portion 102. The inverted U-shaped body 140 defines a pair of gauging surfaces 141 upon which strain gauges 142 are bonded. Referring to FIG. 5, a preferred positioning of the strain gauges 142 is shown. One of the two gauging surfaces 141 is shown in FIG. 5, with the other of the gauging surfaces 141 having a similar strain gauge configuration. Accordingly, each gauging surface 141 has a pair of strain gauges 142 thereon, with the strain gauges 142 being perpendicularly disposed with respect to one another, such that one of the strain gauges 142 of each gauging surface 141 reacts in compression, while the other one of the strain gauges 142 reacts in tension, or vice versa. As will be described hereinafter, the four strain gauges 142 are wired in a bridge configuration so as to obtain precise strain measurement of the solid structure S.

The posts 120 of the mount portion 102 amplify bending deformation of the solid structure S. The posts 120 are preferably made of the same material and have a similar configuration (i.e., length, cross-section, dimension of the support portions 123), such that thermal changes have negligible effect on the strain measurement performed by the sensor apparatus 100. The surface of contact between the apparatus 100 and the solid structure S is relatively small to limit friction therebetween for more accurate measurement.

A casing (not shown) is typically provided to conceal the sensor apparatus 100. The sensor apparatus 100 can be installed on existing structures. The sensor portion 104 is preferably bolted (but may also be welded thereto) to the mount portion 102 once the mount portion 102 has been secured to the solid structure S. The sensor apparatus 100 is designed to monitor the pressure, the strain, the stress, the overload, the fatigue level, and the strength of any solid structure. The solid structure S can be resting on the ground or can be supported in another way, and may be of any solid material. Any suitable transducer configuration can be used for the interpretation of the strain picked up by the strain gauges.

Figure 6:
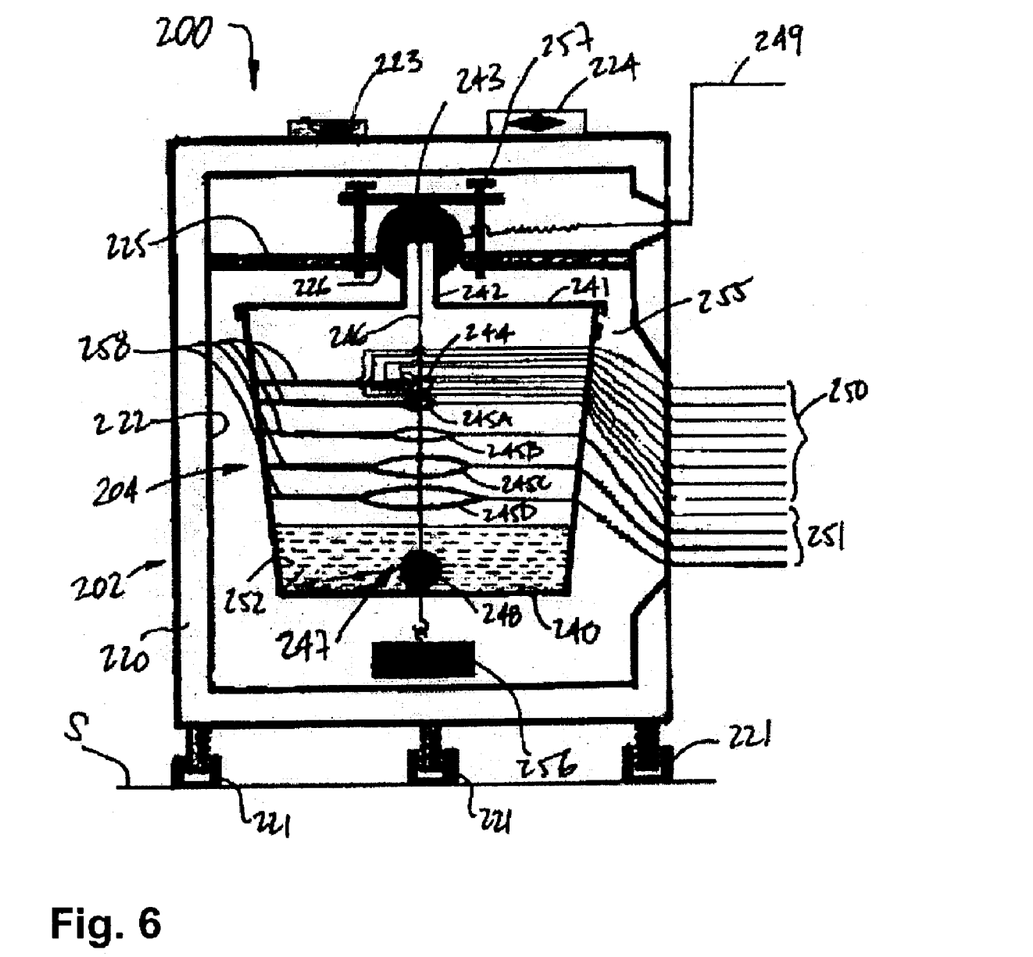
FIG. 6 is a schematic cross-sectional view of a multicontact pendulum sensor in accordance with the present invention.

Referring to the drawings, and more particularly to FIG. 6, a multicontact pendulum sensor apparatus is generally shown at 200, and will be referred to hereinafter as "sensor apparatus 200." The sensor apparatus 200 has a mount portion 202 and a sensor mechanism 204.

The mount portion 202 has a casing 220, having legs 221 by which the sensor apparatus 200 is supported on a surface S of an element to be monitored. The legs 221 are adjustable in height and are used in combination with a spherical level 223 on top of the casing 220 to set the sensor apparatus 200 horizontally. The casing 220 also has a compass 224, which will be used to orient the sensor apparatus 200.

The casing 220 defines an inner cavity 222 adapted to receive the sensor mechanism 204 therein. The casing 220 has, for instance, a removable cover so as to provide access to the inner cavity 222. A support plate 225 is horizontally disposed in the inner cavity 222, and defines a circular opening 226 by which the sensor mechanism 204 will hang freely in the inner cavity 222. The casing 220 and the support plate 225 of the casing 220 mostly consist of nonconductive materials.

The sensor mechanism 204 has a bucket-type housing 240, having an inner cavity. The housing 240 has a removable cover 241. The cover 241 has a concentrically disposed tube 242 with a ball connector 243 at a free end of the tube 242. The center of the ball connector 243 is aligned with a center of the cover 241 and a central axis of the tube 242. The housing 240 hangs freely in the inner cavity 222 of the casing 220 by the ball connector 243 being supported by the support plate 225 and the tube 242 passing through the opening 226. The cooperation between the circular opening 226 and the ball connector 243 allows free movement of the sensor mechanism 204 in three rotational degrees of freedom with respect to the mount portion 202.

An orientation ring 244 and amplitude rings 245 are supported by nonconductive support arms 258 so as to be concentrically disposed with respect to the central axis of the housing 240. This central axis of the housing 240 passes through the center of the cover 241 and of the ball connector 243, and is coincident with the axis of the tube 242. The orientation ring 244 is positioned above the amplitude rings 245. Thereafter, amplitude rings 245A, 245B, 245C and 245D sequentially increase in diameter from top to bottom. The orientation ring 244 is connected to a monitoring board by a plurality of orientation output wires 250. Similarly, each of the amplitude rings 245 has a respective amplitude output wire 251, so as to be connected to the monitoring board.

A pendulum 247 hangs freely from a center of the ball connector 243 and passes through each of the rings 244 and 245. The pendulum 247 has a weight 248 at a bottom end thereof. The wire 246 of the pendulum 247 is conductive, and is connected to input wire 249 such that an input signal can be fed to the pendulum 247. Preferably, a liquid is provided in the housing 240 to dampen movement of the weight 248 of the pendulum 247. Typically, the liquid is a nonconductive antifreeze oil.

As the pendulum 247 hangs freely in the inner cavity of the housing 240, it is free to swing in any direction. The amplitude rings 245 are sized such that the wire 246 of the pendulum 247 comes into contact with the smaller ring (i.e., 245A) and gradually with the following ring in diameter. The orientation ring 244 is smaller than the amplitude rings 245, whereby contact between the wire 246 and the orientation ring 244 will precede or accompany contact between the wire 246 and any one of the amplitude rings 245.

Figure 7:
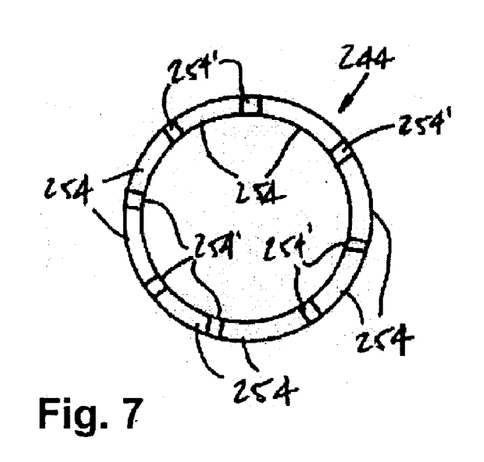
FIG. 7 is a top plan view of an orientation ring of the multicontact pendulum sensor apparatus of the present invention to indicate the direction of the tilting.
Figure 8:
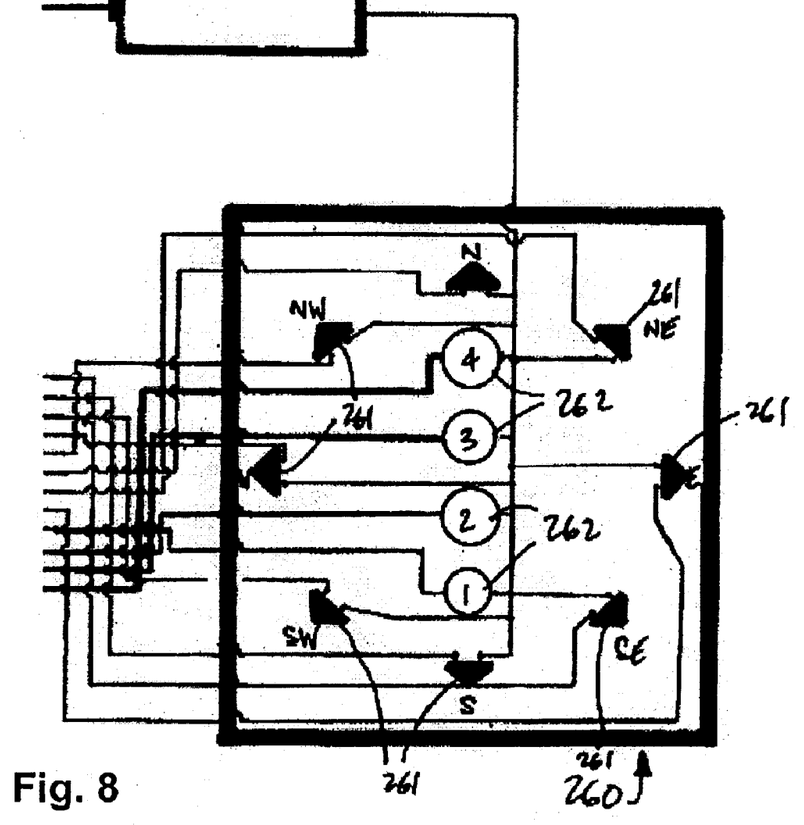
FIG. 8 is a top plan view of a monitoring board of the multicontact pendulum sensor apparatus of the present invention.
Figure 9:
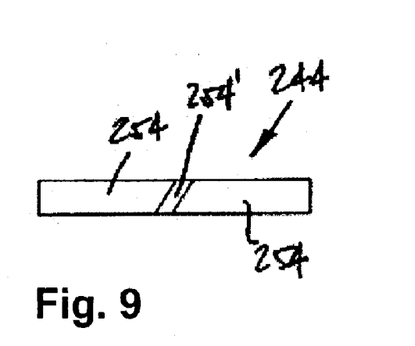
FIG. 9 is a side, elevational view of the orientation ring to indicate the direction of the tilting.

Referring to FIG. 7, the orientation ring 244 is shown consisting of eight annular segments 254. The annular segments 254 are separated by nonconductive spacers 254'. As shown in FIG. 9, ends of the annular segment 254 overlap one another. Each of the annular segments 254 is wired such that, when the wire 246 of the pendulum 247 comes into contact with one of the annular segments 254 (or two, in the case of overlapping annular segments 254), current from the input wire 249 is conducted to the appropriate orientation output wire 250. Each of the annular segments 254 is given an orientation such that transmission of current from the pendulum 247 to the orientation ring 244 will be identified as an orientation. Accordingly, a displacement of the pendulum 247 will have an orientation. It is pointed that, although the orientation ring 244 is shown having eight annular segments 254, more or fewer annular segments 254 may be provided for the orientation ring 244.

The increasing diameter of the amplitude rings 245 from top to bottom ensures that the wire 246 of the pendulum 247 will come into contact with the smallest amplitude ring, namely amplitude ring 245A. Once more, the contact between the wire 246 and the amplitude rings form a loop, whereby the amplitude output wire 251 will send a signal with regard to the amplitude ring 245 in which contact has occurred between the pendulum 247 and the amplitude ring 245.

The fluid 252 is provided to reduce unwanted negligible oscillations of the pendulum 247. Referring to FIG. 9, a monitoring board to be used in conjunction with the sensor apparatus 200 is generally shown at 260. The monitoring board 260 of this embodiment has orientation indicators 261 and amplitude indicators 262, and is wired to the orientation output wires 250 and the amplitude output wires 251. The orientation indicators 261 are each combined to one of the annular segments 254 of the orientation ring 244 via the respective orientation output wires 250. The orientation indicators 261 are combined with orientation indicia, as illustrated in FIG. 9, to indicate the direction of the tilting of the element under study. Similarly, the amplitude indicators 262 are each combined to a respective amplitude ring 245 to give, e.g., a schematic illustration of the amplitude. For instance, an amplitude level of 3 may indicate a warning of strong amplitudes, whereas an amplitude level of 4 can trigger an alarm.

The sensor apparatus 200 must be calibrated in order to match the orientation of the respective annular segments 254 with the actual cardinal points. A cardinal point indicator 255 (e.g., north) is provided on the housing 240 such that the housing 240 can be rotated to match the actual orientation provided by the compass 224. The ball connector 243/circular opening 226 configuration enables rotation of the sensor mechanism 204 in accordance with the appropriate orientation. A weight 256 ensures that the sensor mechanism 204 is aligned vertically prior to the orientation. The weight 256 may be removed thereafter for normal operation of the sensor apparatus 200. A fixing mechanism 257 is also used to prevent movement between the sensor mechanism 204 and the mount portion 202, once the orientation is set and the sensor mechanism 204 is vertically positioned. Accordingly, the pendulum 247 will be the only movable portion of the sensor apparatus 200, whereby level variation of the surface S can be qualified in magnitude and orientation.

The sensor apparatus 200 can be used to indicate the tilting progress of structures against time, wind, earthquake, loads, landslide, defects in material, and weak support or foundation. The longer the wire of the pendulum 247 is, the more sensitive the apparatus will be to small degrees of tilting. Similarly, the smaller the amplitude rings 245 are, the more sensitive the sensor apparatus 200 will be to small degrees of inclination. Obviously, more or fewer amplitude rings 245 can be provided.

The sensor apparatuses 10, 100 and 200 can be used individually or simultaneously in a plurality of structures. More particularly, but not exclusively, bridges, tunnels, dams, earthquake detection systems, landslide detection systems, silos, tanks, reservoirs, roofs, railways, subways, foundations, floors, walls, nuclear plants, industrial chimneys, high-rise buildings and towers, industrial signs, cranes, high-rise posts for cable carts, power lines and amusement parks, and involve the sensor apparatuses of the present invention.

Figure 10A:
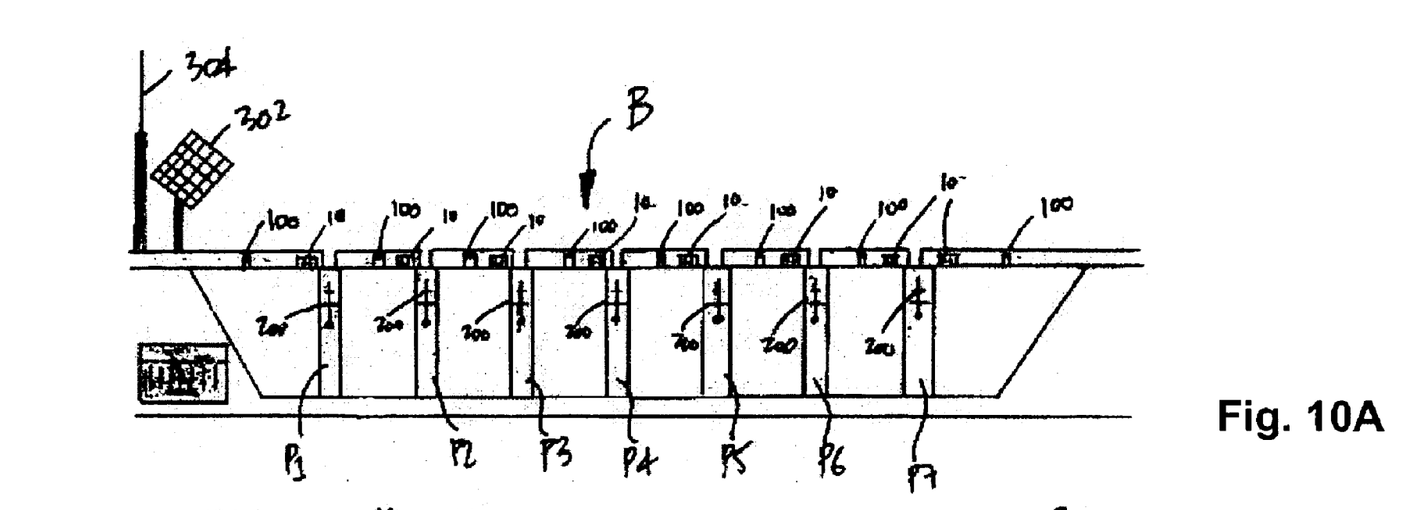
FIG. 10A is a schematic side elevation view of a bridge equipped with sensor apparatuses of the present invention.

For instance, FIG. 10A illustrates a bridge B. The level monitoring sensor apparatuses 10 are installed on the spans of the bridge, along with the solid structure sensor apparatus 100, to monitor any unusual activity (e.g., level and deflection) of the bridge B. The multicontact pendulum sensor apparatuses 200 are installed in the piers P to monitor the tilt.

Figure 10B:
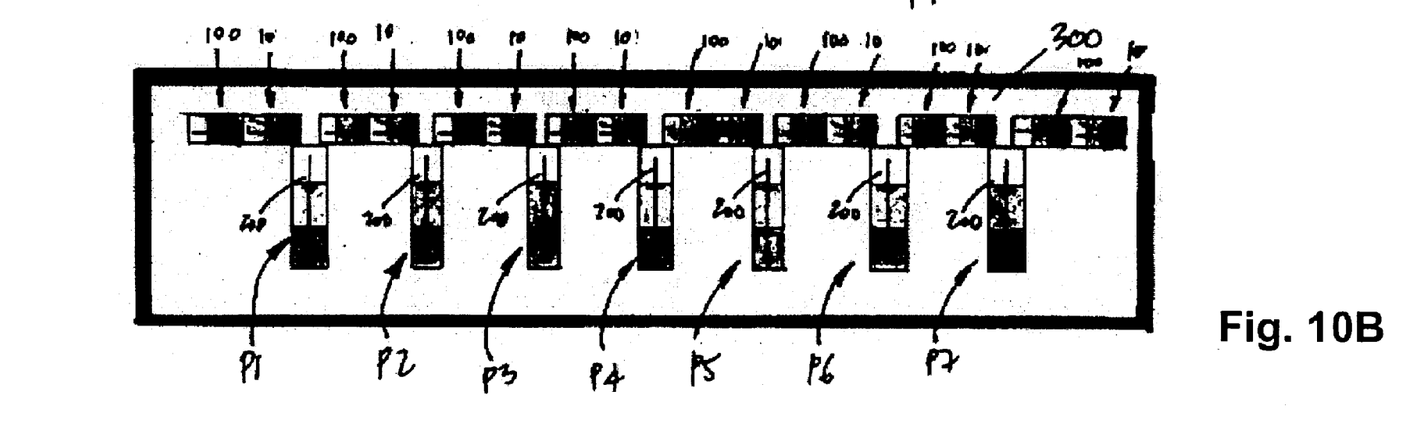
FIG. 10B is a schematic top plan view of a monitoring board of the bridge of FIG. 10A.

The group of sensor apparatuses 10, 100 and 200 on the bridge B can be powered by solar energy. A solar panel is shown at 302. A control station positioned remotely from the bridge B can receive sensor apparatus data through a communication system such as wireless communication antenna 304. A monitoring board 300 is illustrated in FIG. 10B, and can be provided as an intensity indicator to indicate to a bridge traffic operator whether the bridge B can be used.

For instance, each of the sensors 10, 100 and 200 installed on the bridge B can be connected to three lights on the monitoring board 300, with a red light indicating hazardous unusual activity, that could prompt the operator to close the bridge B.

It is within the ambit of the present invention to cover any obvious modifications of the embodiments described herein, provided such modifications fall within the scope of the appended claims.

What is claimed is:

1. An apparatus for monitoring deformation and stress in a given orientation of a structure, comprising:
    a first post and a second post each having a connection end adapted to be secured to a structure to be monitored, and a free support end, the free support ends of the first post and the second post being separated by a gap, the gap being oriented as a function of said given orientation;
    a sensor portion having a first leg and a second leg, the first leg and the second leg being interconnected at a first end, and each connected to a respective one of the free support ends at a second end so as to bridge the gap such that a deformation and stress of the structure causes strain of the first leg and the second leg of the sensor portion; and
    at least one sensor on a surface of at least one of the legs, the at least one sensor adapted to be wired to a control system to quantify a deformation of the structure as a function of said strain.

2. The apparatus according to claim 1, wherein the first post and the second post have a similar cross-section and height configuration.

3. The apparatus according to claim 1, wherein the sensor portion is an inverted U-shaped bracket.

4. The apparatus according to claim 1, wherein the free support ends are flanges generally perpendicular with respect to the first and second post, with the first leg and the second leg of the sensor portion each sitting on a respective one of the flanges.

5. The apparatus according to claim 1, wherein the at least one sensor is a strain gauge.

6. The apparatus according to claim 5, wherein the first leg and the second leg of the sensor portion each have at least one strain gauge.

7. The apparatus according to claim 5, wherein each of the first leg and the second leg has a pair of said strain gauge, with the strain gauges being perpendicularly disposed with respect to one another.

* * * * *